United States Patent [19]

Khoury et al.

[11] Patent Number: 5,303,031
[45] Date of Patent: Apr. 12, 1994

[54] ALL OPTICAL PHASE SENSITIVE DETECTOR AND IMAGE DEMULTIPLEXER

[75] Inventors: Jihad Khoury, Somerville; Philip R. Hemmer, Fitchburg; Charles L. Woods, Stow; Vincent E. Ryan, Arlington, all of Mass.

[73] Assignee: The United States of America as represented by the Secretary of the Air Force, Washington, D.C.

[21] Appl. No.: 880,399

[22] Filed: May 8, 1992

[51] Int. Cl.$^5$ .............................................. G01B 9/02
[52] U.S. Cl. .................................. 356/345; 356/354; 356/359; 359/245
[58] Field of Search ............... 356/352, 353, 354, 359, 356/345; 359/240, 245

[56] References Cited

U.S. PATENT DOCUMENTS

| | | | |
|---|---|---|---|
| 4,294,544 | 10/1981 | Altschuler et al. | 356/352 X |
| 4,536,861 | 8/1985 | Graindorger et al. | 356/345 X |
| 4,558,952 | 12/1985 | Kulesh et al. | 356/352 |
| 4,670,646 | 6/1987 | Spivey | 356/354 X |
| 4,934,815 | 6/1990 | Tai et al. | 356/354 |
| 4,956,834 | 9/1990 | Coleman | 356/345 X |
| 4,991,963 | 2/1991 | Sutton | 356/353 |
| 5,040,896 | 8/1991 | Moslehi | 356/351 |

OTHER PUBLICATIONS

Attached three pages of abstracts handed out in Nov. 1990 at the annual meeting of the Optical Society of America.

Primary Examiner—James C. Housel
Assistant Examiner—Harold Y. Pyon
Attorney, Agent, or Firm—Robert L. Nathans; Donald J. Singer

[57] ABSTRACT

Method of demultiplexing a composite signal light beam includes the steps of directing the composite signal light beam and a reference light beam at a photorefractive material, modulating the reference beam at a frequency about equal to the modulation frequency of a selected signal beam to be demultiplexed, and recovering the phase conjugate signal produced by interference of the reference beam with the composite signal light beam within the photorefractive material. The method also enables optical phase detection of the selected signal beam with respect to the reference beam.

20 Claims, 3 Drawing Sheets

ALL OPTICAL PHASE SENSITIVE DETECTOR AND IMAGE DEMULTIPLEXER

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of optical phase sensitive detection.

It would be highly desirable to provide a technique which employs optical phase sensitive detection in numerous applications which previously benefitted from electronic phase sensitive detection. In addition, since optical phase sensitive detection can be applied to two-dimensional data such as images, massive parallel phase sensitive detection schemes could be employed to great advantage. For example, image multiplexing could be done by encoding numerous images at different frequencies in the same input channel. Using optical phase sensitive detection, the images can be easily separated out, thereby enabling real time video information to be transmitted in audio bandwidth channels. A special case would be an image comprising a large array of dots, each representing separate audio channels. This could be modulated with a GHz carrier frequency to increase effective data rates per unit bandwidth. This would be especially useful for images transmitted in coherent fiber bundles, where it should be possible to utilize the full optical bandwidth available. Applications to digital communication systems will increase throughput rates by taking advantage of the massive parallelism inherent in our novel technique.

Thus, two-dimensional phase shift keying can be realized using spatial light modulators (SLMs) to encode symbols in matrix form, and optical phase sensitive detection can be used to demodulate the symbol matrix. Further extensions to two-dimensional digital communication systems can be made such as frequency shift keying where coherent detection is important.

SUMMARY OF PREFERRED EMBODIMENTS OF THE INVENTION

In accordance with the invention, the lock in detection characteristic of real time holograms in a photorefractive time integrating nonlinear optical element (NOE) is employed to provide a new optical technique of frequency division demultiplexing. A composite signal light beam is inputted having numerous signal beams, each signal beam being amplitude or phase modulated at a frequency which differs from the modulation frequencies of the other signal beams. A reference light beam is directed at the NOE along with the composite signal light beam, and the reference beam is modulated by a modulation frequency substantially equal to the modulation frequency of that signal beam which is to be detected or demultiplexed at a particular time and a stationaly hologram is produced in the NOE which is read out by a coherent read out light beam as the detected demultiplexed output signal.

Entire two-dimensional images can be rapidly demultiplexed by this technique. When both the reference and signal beams are modulated by the same frequency, a DC phase conjugate beam is outputted having an intensity that is dependent on the phase difference and hence the technique can be used as a phase sensitive detector for binary signal transmission links.

DESCRIPTION OF THE DRAWINGS

Other objects, features and advantages of the present invention will become apparent upon study of the following description, taken in conjunction with the drawings in which.

DETAILED DESCRIPTION OF EMBODIMENTS OF THE INVENTION

Figure 1:
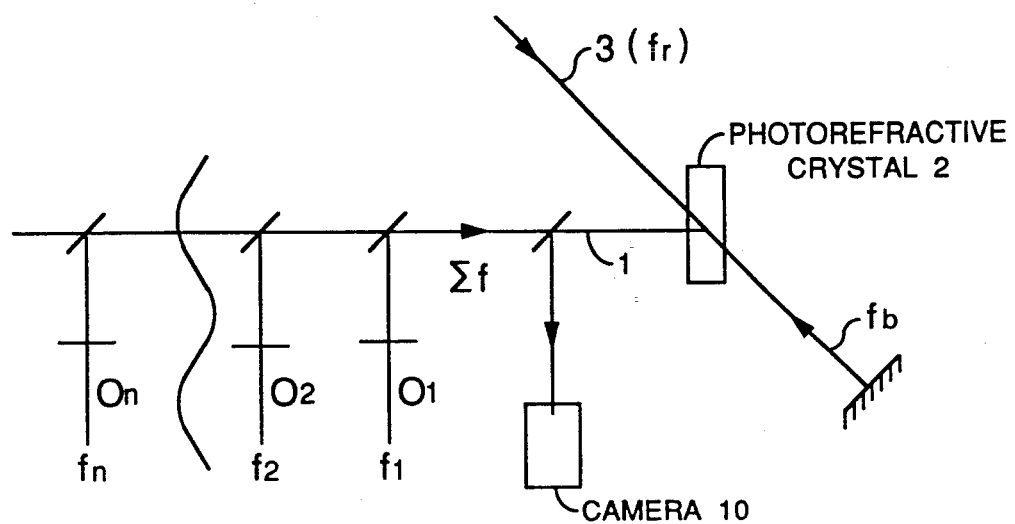
FIG. 1 schematically illustrates optical image demultiplexer architecture.

The basic architecture of an optical demultiplexer is shown in FIG. 1. As in the electrical analog, the first stage of the optical demultiplexer involves generating several input images $O1(x,y)$, $O2(x,y)$, $On(x,y)$ which are individually phase modulated by sub-frequencies $f1$, $f2 \ldots fn$ respectively. The modulated images are combined and transmitted to NOE crystal 2 as the object beam of a photorefractive demultiplexer. The reference beam 3 is generated separately with a modulation frequency $fr$, which can be tuned to any of the desired image modulation frequencies. Reference beam 3 and object beam 1 are then interfered in nonlinear optical element (NOE) 2 which could comprise a photorefractive crystal to produce a real time hologram.

Due to the different modulation frequencies present, running interference fringes will result at the difference and summation frequencies, i.e. $f1-fr$, $f2-fr \ldots fn-fr$, $f1+fr$, $f2+fr \ldots fn+fr$, and their multiple images. These moving fringe patterns will generate moving holographic gratings in NOE 2. However, for fast modulation frequencies, the finite response time of the material of NOE 2 will lead to suppression of rapidly moving gratings. Thus, low pass filtering results and a backward read beam $fb$ will only diffract off of those gratings which move slowly enough for the photorefractive media of NOE 2 to respond. Thus if the modulation frequency of the reference beam $fr$ is equal to the modulation frequency for a particular image, then recovery of that image by video camera 10 occurs via standard four wave mixing phase conjugation. Since a standard four wave mixing setup is used, the resolution achievable with this demultiplexing scheme is high, on the order of 1000 lines/ mm for a bismuth silicon oxide (BSO) NOE 2.

Figure 2:
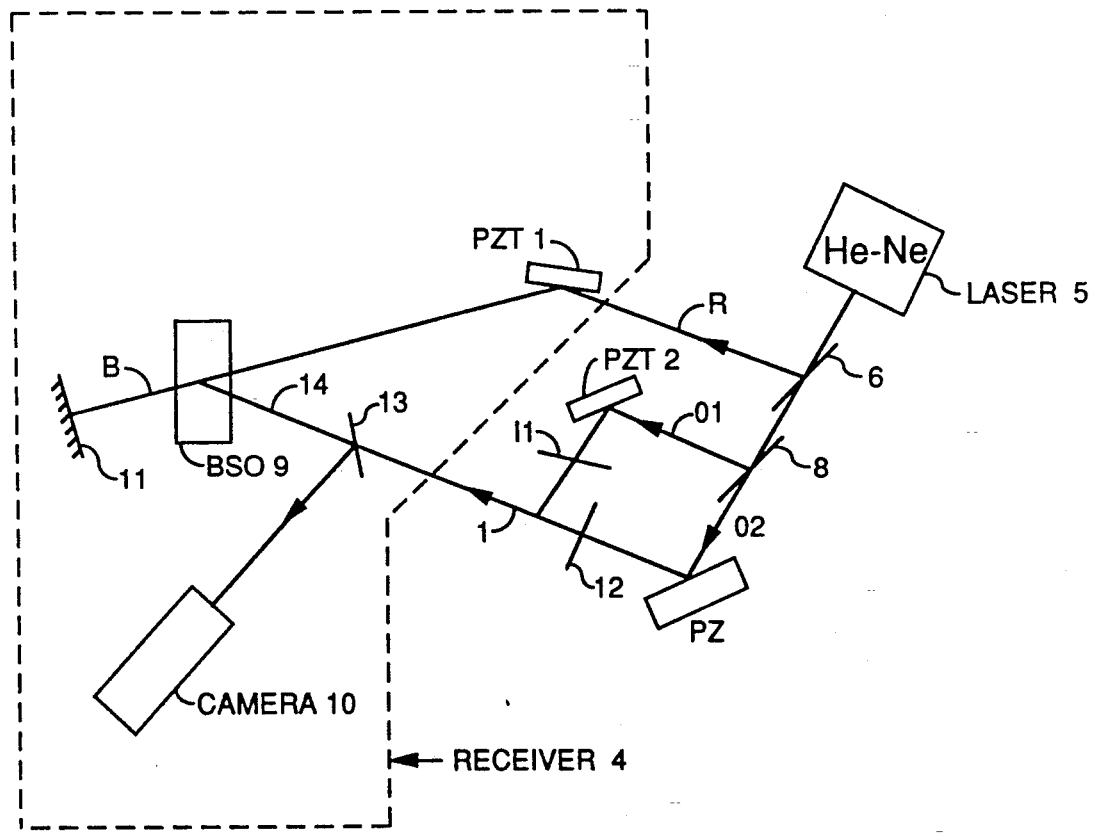
FIG. 2 illustrates an experimental setup for image demultiplexing.

Our experimental setup for demonstrating optical image demultiplexing is shown in FIG. 2. This is essentially a standard four wave mixing configuration, modified by the use of piezoelectric transducers having mirrors mounted thereon. A He-Ne laser 5 produces an input beam separated into a 2.2 mw reference beam R by beamsplitter 6, a 2.8 mw object beam O1 by beamsplitter 8 and a 0.8 mw object beam O2. Images I1 and I2 modulate the object beams with signals to be transmitted to receiver 4 and demultiplexed. The spot diameters of all beams were about 2 mm. The composite signal input beam 1 transmitted to the demultiplexer thus has numerous object beams, each modulated by an image to be detected by the demultiplexer camera 10. Only two object beams are shown for simplicity. Thus, two-dimensional video signals were transferred to each object beam by placing separate transmissive resolution charts I1 and I2 in the object beam paths. Piezoelectric transducer PZT1 is provided to phase modulate the reference beam at a modulation frequency substantially equal to the modulation frequency of the signal beam to be selected for demultiplexing at any particular time. For example, assume PZT2 modulates O1 at 25 HZ, PZT3 modulates O2 at 200 Hz., we select signal beam O1 for demultiplexing by driving the reference beam PZT1 at 25 Hz, whereas we select signal beam O2 by driving PZT1 at 200 Hz as PZT3 phase modulates O2 at 200 Hz.

The composite signal beam is interfered with the reference beam in the BSO nonlinear optical element 9, and the resulting hologram is read out via a 1.2 mw read-beam B which is generated by retroflecting the reference beam R via retro-reflector 11. Beamsplitter 13 and video camera 10 enable the selected two-dimensional demultiplexed image to be recorded or displayed.

When PZT2 and PZT3 phase modulate their respective object beams, both images disappear from the phase conjugate return beam 14 as shown in FIG. 3D. The phase modulation utilized in this case was a square wave with a phase modulation amplitude of pi/2. To recover I1, the reference beam is modulated at the same frequency as that of O1,(25 Hz.). The resultant phase conjugate signal is shown in FIG. 3E. As can be seen, image O1 is recovered without visible crosstalk. Similarly, modulating the reference beam at the same frequency as that of I2, allowed I2 to be recovered without visible crosstalk as shown in FIG. 3F. Note the lack of any apparent degradation of the image resolution or signal to noise due to the demultiplexing operation.

For this demonstration equipment, optimal image recovery was achieved by electronically phase locking the reference beam modulation frequency to that of the selected object beam. It is also possible to recover images by simply tuning the reference modulation frequency near that of the object beam to be recovered. In this case, an oscillating phase conjugate image appears, provided that the beat frequency between object and reference modulation frequencies is smaller than the inverse response time of the photorefractive crystal of BSO 9., which is 30 Hz for BSO. If required, phase locking optimization can be achieved by detecting the conjugate image with a photodetector to generate a feedback signal which can then be applied either to the BSO 9 or to the reference beam modulator.

Thus far we have shown experimentally that two images can be demultiplexed without visible crosstalk for frequencies in the sub-khz range and frequency separation less than 200 Hz. For a high capacity demultiplexer, this same performance should be demonstrated at much higher frequencies.

In theory, the maximum modulation frequencies are only limited by the optical frequency of about 10 hz. However, to approach this limit, two separate lasers would be needed and the effect of laser jitter would make implementation impractical. Instead, using a high speed phase modulator of 1 Ghz, we can generate the necessary multiple optical frequencies using a single laser so that absolute laser jitter becomes much less important. Unfortunately, only two high speed modulators and microwave drivers were available to us for this experiment. Therefore, we were only able to demonstrate extension of the optical lock-in detection capability out to one Ghz modulation frequencies using a single Gaussian object beam rather than two distinct images.

Figure 3:
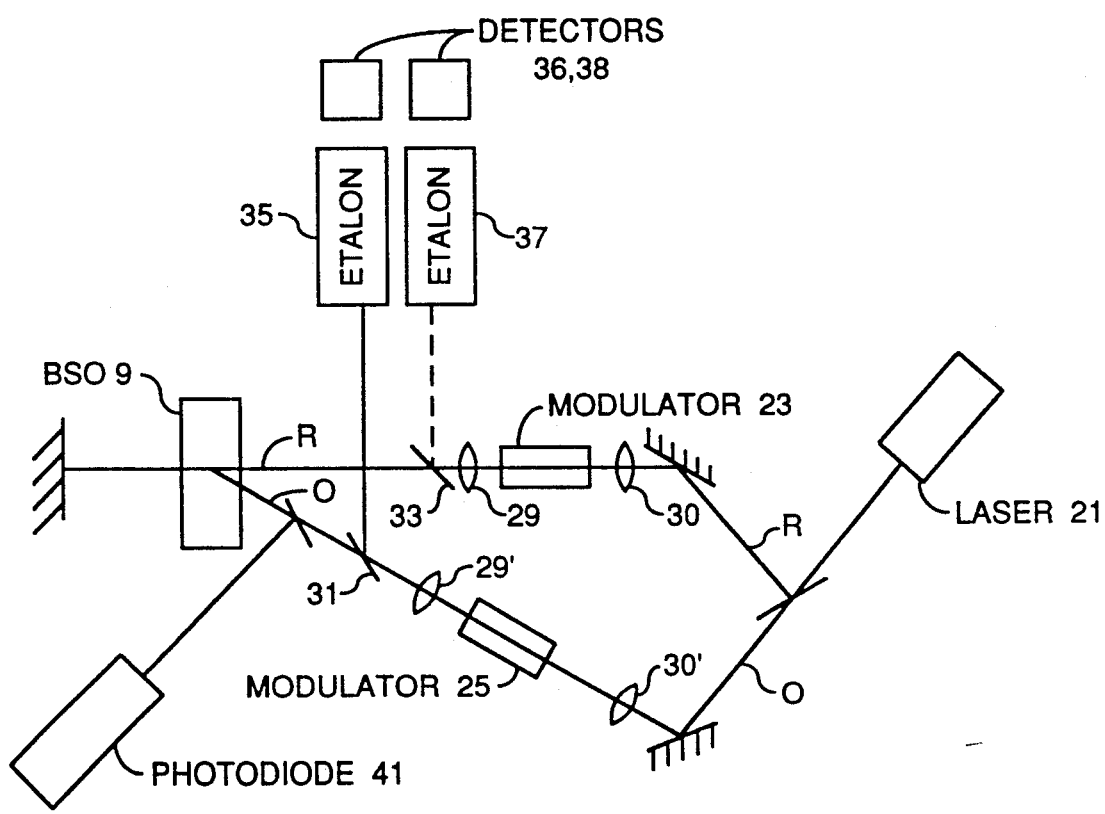
FIG. 3 illustrates an experimental setup for the demonstration of lock-in detection at one GHz.

FIG. 3 shows our modified experimental arrangement for one Ghz lock-in detection. Once again, it is a standard four wave mixing configuration using a BSO crystal 9 and an intersection angle of thirty degrees between the reference and object wave. Laser 21 produces a reference beam R and an object beam O. LiTaO electro-optic modulators 23 and 25 are used to produce the one Ghz phase modulation. These modulators are driven with independently synthesized microwave signals near One Ghz, derived from a common quartz crystal. To achieve high drive voltages with less than one watt of microwave input power, the modulators are mounted in a resonant LC circuit, not shown, with a Q of about 200 at one Ghz. Crystal dimensions are $1 \times 1$ mm $\times 70$ mm long. Since the input laser beams are too large to fit directly into the modulating crystals, telescopic arrangements with unity magnification are used as indicated by FIG. 4. These telescopic arrangements each include two 10 cm lenses 29, 30, 29', 30' spaced two focal lengths apart with a modulator positioned at the beam waist.

To monitor the performance of the phase modulators, a portion of each modulated beam is picked off by a separate beamsplitter 31 and 33 and directed to Fabry-Perot etalons 35 and 37 coupled to signal trace readout detectors 36 and 38 as shown. The broad (about 1 Ghz. wide) Fabry-Perot resonances observed are a consequence of the multi-longitudinal mode operation of the high power He-Ne laser. Clearly independent lasers with such broad linewidths would not be practical for this type of demultiplexing operation.

Introducing a weak modulation voltage at one Ghz into the reference beam phase modulator generates the first order sidebands. When the applied microwave power is increased strong suppression of the carrier results, which is important for reducing crosstalk in the demultiplexing operation.

To demonstrate optical phase sensitive detection, we align the system for maximum phase conjugate return with both modulators off. Next, the reference beam only is phase modulated at a frequency of about one Ghz, where the modulation amplitude is large enough to strongly suppress the carrier, and the conjugate signal vanishes. The measured on/off ratio for the phase conjugate signal is greater than 15 db where the measurement was limited by noise from the scattered light.

The object beam was then phase modulated with a second microwave signal also near one Ghz but 0.8 Hz above the reference modulation frequency. Hence, the two frequencies are substantially equal. This causes the phase conjugate signal to reappear with an intensity that oscillates at the 0.8 Hz beat frequency. Photodiode 41 at the output plane detects this signal for display upon a chart recorder. The resulting data appears in the top traces of FIGS. 4a, 4b, and 4c where the bottom traces display the amplitude of an electronic beat signal derived from a microwave mixer.

Figure 4A:
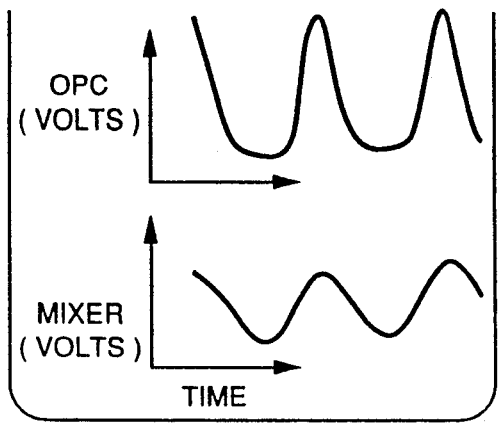
FIGS. 4a, 4b, 4c, and 5 illustrate various data to be described.
Figure 4B:
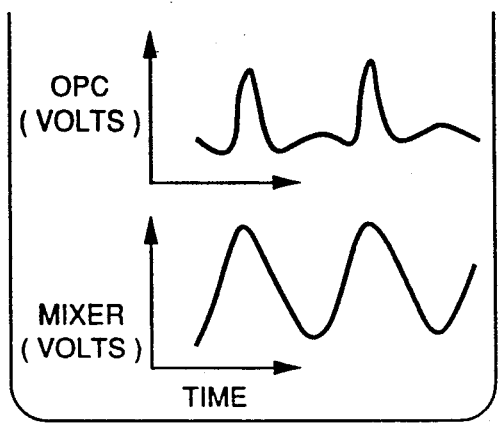
Figure 4C:
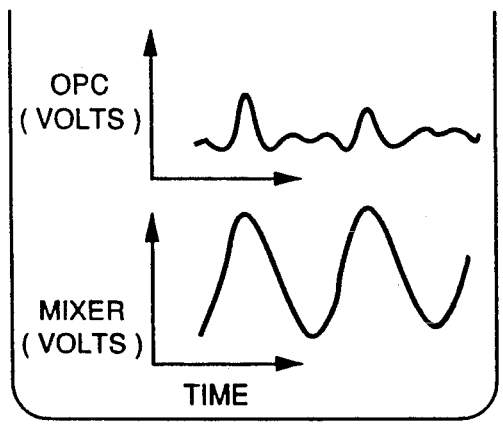

The different data sets in FIGS. 4a, 4b, and 4c correspond to different modulation amplitudes in the object beam. FIG. 4a demonstrates the case of a small modulation amplitude. As seen, the phase conjugate signal appears as a distorted sine wave where the minimum signal is zero within the 15 db on/off ratio measurement limitation mentioned above. For larger phase modulation amplitudes in the object beam, as shown in FIG. 4b and 4c, additional structure appears in the oscillating phase conjugate signal. Physically, this structure arises from holographic interference between the higher order phase modulation sidebands in both the reference and object beams.

We also tried using modulator frequency differences larger than 0.8 Hz and found that the phase conjugate signal is attenuated more than a factor of ten for beat signals greater than about 30 Hz. Similar results were previously observed at sub-khz modulation frequencies. From this we can infer that our demonstrated video image demultiplexing technique can also be extended to one Ghz modulation frequencies.

Figure 5:
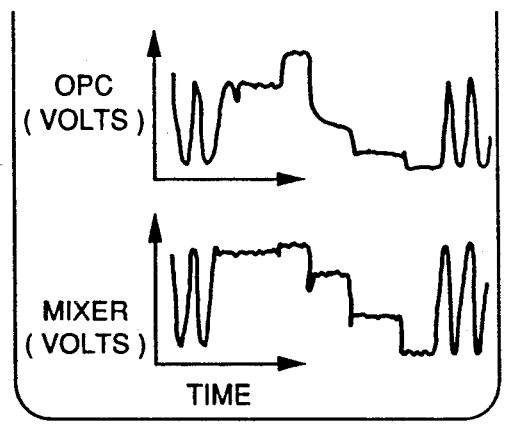

Finally, we also examined the optical mixing and lock-in capability of this technique by applying identical one Ghz phase modulation to both the object and reference beams. FIG. 5 shows the resulting phase conjugate and microwave mixer signals. Weak object beam modulation is employed and several fixed phases are used. The phase is adjusted manually by momentarily changing the frequency of one microwave synthesizer. As seen, the phase conjugate output signal approximately follows the microwave mixer signal with only a small long-term phase drift.

It should now be appreciated that an optical lock-in frequency demultiplexing technique has been demonstrated which utilizes the low band-pass characteristics of a photorefractive material. We have experimentally demultiplexed actual video images with sub-khz modulation frequencies separated by less than 200 hz and have shown that the lock-in technique can be extended out to one Ghz modulation frequencies with similar signal bandwidths. It should be possible to extend this technique to at least 12 Ghz which is the limit of operation of the modulators of FIG. 3. Currently, the possibility exists of multiplexing/ demultiplexing a few hundred video images using techniques already demonstrated for photorefractives. See F. H. Mok et al., Opt. Lett. 16, 605 (1991). Also, if this technique can be adapted to cyrogenic spectral hole burning materials, much larger channel capacity should be achievable.

The potential for signal processing applications of this technique is enormous. For example, an image consisting of a 1024×1024 array of spots, each carrying 100 Hz audio information, could be transmitted as a single image on a phase modulated object beam with a one Ghz modulation frequency. This corresponds to an ideal data rate of 10 bits/sec, using only about 10 of the total available bandwidth. Of course, cross talk and other effects will limit the actual amount of limited bandwidth. The actual introduced loss will have to be calculated or experimentally verified.

Since other embodiments of the invention will become apparent to the worker in the art, within the true spirit of the invention, the scope of the invention is to be limited only by the terms of the following claims and art recognized equivalents thereof. For example, the term "signal" need not mean intelligence but could include noise sources to be eliminated. Reference and/or signal modulation can be phase modulation or amplitude modulation or single sideband modulation, where an example of an optical single sideband modulator is an acousto-optic device.

We claim:

1. Method of processing a composite signal light beam having a plurality of signal light beams to be detected, each signal light beam being modulated by a modulation frequency which differs from modulation frequencies of other signal light beams comprising the steps of:
    (a) directing a reference light beam at a time integrating nonlinear optical element;
    (b) directing said composite signal light beam at said nonlinear optical element for producing interference patterns within the nonlinear optical element between said reference light beam and said composite signal light beam;
    (c) modulating the reference beam at a reference beam modulation frequency substantially equal to the modulation frequency of a selected signal beam of the composite signal light beam for producing a particular interference pattern within the nonlinear optical element capable of being read out of the nonlinear optical element; and
    (d) reading out said particular interference pattern from said nonlinear optical element to retrieve a selected signal of the composite signal light beam.

2. The method of claim 1 wherein said signal light beams comprise two-dimensional light images and interference patterns produced within the nonlinear optical element are holographic for reconstructing light images read out in accordance with step (d).

3. The method of claim 1 including phase modulating the reference beam at a reference beam modulation frequency while carrying out step (c).

4. The method of claim 2 including phase modulating the reference beam at a reference beam modulation frequency while carrying out step (c).

5. The method of claim 3 including the step of measuring the intensity of the selected signal read out of the nonlinear optical element in accordance with step (d) to thereby detect the phase difference between the modulation of the reference beam signal and the modulation of the selected signal beam.

6. The method of claim 4 including the step of measuring the intensity of the selected signal read out of the nonlinear optical element in accordance with step (d) to thereby detect the phase difference between the modulation of the reference beam signal and the modulation of the selected signal beam.

7. Apparatus for processing a composite signal light beam having a plurality of signal light beams to be detected, each signal light beam being modulated by a modulation frequency which differs from frequencies of other signal light beams comprising:
    (a) reference light beam directing means for directing a reference light beam through a time integrating nonlinear optical element;
    (b) signal light beam directing means for directing said composite signal light beam at said nonlinear optical element for producing interference patterns within the nonlinear optical element between said reference light beam and said composite signal light beam;
    (c) reference beam modulating means for modulating the reference beam at a reference beam modulation frequency substantially equal to the modulation frequency of a selected signal beam of the composite signal light beam for producing a particular interference pattern within the nonlinear optical element capable of being read out of the nonlinear optical element; and
    (d) readout means for reading out said particular interference pattern from said nonlinear optical element to retrieve a selected signal of the composite signal light beam.

8. Apparatus of claim 7 wherein said readout means includes retro-reflector means for redirecting said reference beam back through said nonlinear optical element.

9. The apparatus of claim 7 wherein said reference beam modulating means is a phase modulator.

10. The apparatus of claim 8 wherein said reference beam modulating means is a phase modulator.

11. The apparatus of claim 7 including means for measuring the intensity of the selected signal read out of the nonlinear optical element to detect the phase difference between the modulation of the reference beam signal and the modulation of the selected signal beam.

12. The apparatus of claim 8 including means for measuring the intensity of the selected signal read out of the nonlinear optical element to detect the phase difference between the modulation of the reference beam signal and the modulation of the selected signal beam.

13. The apparatus of claim 9 including means for measuring the intensity of the selected signal read out of the nonlinear optical element to detect the phase difference between the modulation of the reference beam signal and the modulation of the selected signal beam.

14. The apparatus of claim 10 including means for measuring the intensity of the selected signal read out of the nonlinear optical element to detect the phase difference between the modulation of the reference beam signal and the modulation of the selected signal beam.

15. The apparatus of claim 9 wherein said phase modulator comprises transducer means having a reflector affixed thereto.

16. The apparatus of claim 10 wherein said phase modulator comprises transducer means having a reflector affixed thereto.

17. The apparatus of claim 9 including a laser for directing a coherent light beam at said phase modulator.

18. The apparatus of claim 10 including a laser for directing a coherent light beam at said phase modulator.

19. The apparatus of claim 15 including a laser for directing a coherent light beam at said phase modulator.

20. The apparatus of claim 16 including a laser for directing a coherent light beam at said phase modulator.

* * * * *